United States Patent
Nakamura

(10) Patent No.: US 9,251,430 B2
(45) Date of Patent: Feb. 2, 2016

(54) APPARATUS, METHOD, AND PROGRAM FOR CHARACTER RECOGNITION USING MINIMUM INTENSITY CURVE OF IMAGE DATA

(71) Applicant: NIDEC SANKYO CORPORATION, Nagano (JP)

(72) Inventor: Hiroshi Nakamura, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 14/142,079

(22) Filed: Dec. 27, 2013

(65) Prior Publication Data

US 2014/0185106 A1   Jul. 3, 2014

(30) Foreign Application Priority Data

Dec. 28, 2012 (JP) .................. 2012-286645

(51) Int. Cl.
*H04N 1/40* (2006.01)
*G06K 9/34* (2006.01)

(52) U.S. Cl.
CPC ............ *G06K 9/348* (2013.01); *G06K 2209/01* (2013.01)

(58) Field of Classification Search
CPC combination set(s) only.
See application file for complete search history.

(56) References Cited

U.S. PATENT DOCUMENTS

2008/0240582 A1* 10/2008 Nakamura ................... 382/229

* cited by examiner

*Primary Examiner* — Barbara Reinier
*Assistant Examiner* — Christopher D Wait
(74) *Attorney, Agent, or Firm* — Cantor Colburn LLP

(57) ABSTRACT

A character recognition apparatus may include an imaging element configured to read a character string placed on an information recording medium; an image memory configured to store image data of the character string; and a character segmenting unit configured to segment a character constituting the character string. The character segmenting unit may include a minimum intensity curve creating unit configured to detect a minimum intensity value among light intensity values, and create a minimum intensity curve of the image data according to the minimum intensity value of each pixel row; a character segmenting position detecting unit configured to calculate a space between the characters neighboring in the created minimum intensity curve, in order to detect a character segmenting position between the characters; and a character segmenting process unit configured to segment each character according to the detected character segmenting position between the characters.

5 Claims, 4 Drawing Sheets

FIG. 1
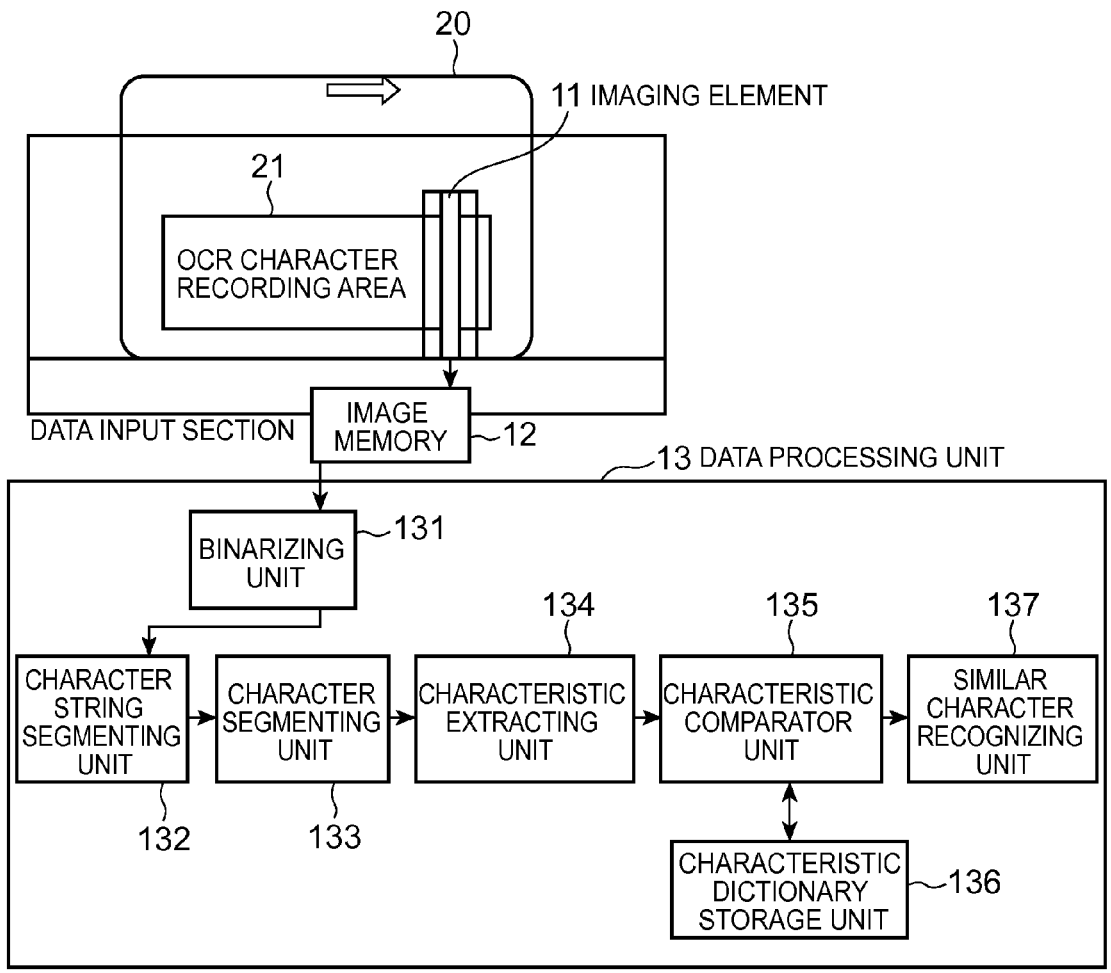
FIG. 2
P<JPNSANKYO<<HANAKO<BCDEFGILMQRTUVWXYZ<<<<<<<
0987654326JPN8503172F1210082<<<<<<<<<<<<<<6
FIG. 3
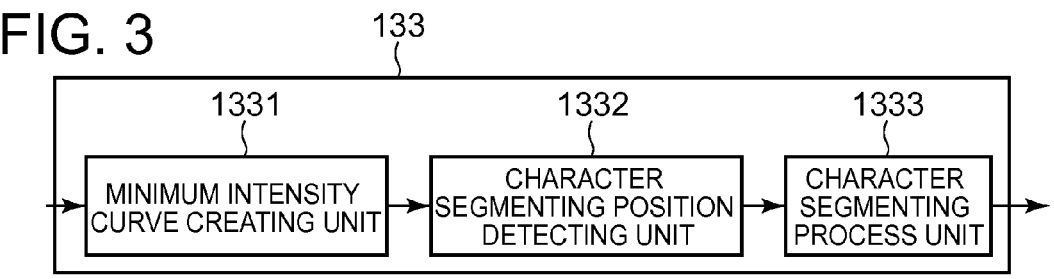

APPARATUS, METHOD, AND PROGRAM FOR CHARACTER RECOGNITION USING MINIMUM INTENSITY CURVE OF IMAGE DATA

CROSS REFERENCE TO RELATED APPLICATION

The present invention claims priority under 35 U.S.C. §119 to Japanese Application No. 2012-286645 filed Dec. 28, 2012, the entire content of which is incorporated herein by reference.

FIELD OF THE INVENTION

The present application relates to a technology of character recognition for recognizing a character string by way of processing image data obtained through capturing an image of the character string placed on an information recording medium of paper, plastic, and the like; and the present application further relates to an apparatus, a method, and a program for character recognition in order to recognize a character while searching for a segmenting position in a character string included in a captured image.

BACKGROUND

Conventionally, used are apparatuses for recognizing a character string printed on a surface of a medium such as a check. For example, known is a character recognition apparatus in which a character part is retrieved out of a binarized image datum, and the character part is segmented along a circumscribing rectangular frame; and then, an amount of characteristic is extracted from a obtained character pattern, and a level of similarity is calculated between a characteristic vector of an input pattern and a reference vector of each character in a characteristic dictionary in such a way that a candidate character is chosen according to the magnitude of the similarity.

In a character segmenting operation of a character recognition apparatus, a position in a direction perpendicular to a character string is detected according to projection data of image data in the direction of the character string. Then, according to the detection, while a detecting position being shifted in the direction of the character string, projection of the image data in the direction perpendicular to the character string is calculated. Subsequently, a position having its obtained projection data exceeding a predetermined threshold is detected as a segmenting position of characters constituting the character string.

The applicant discloses a technology in which the position of the character string in a vertical direction perpendicular to the direction of the character string is detected in the operation of segmenting a character from the image data according to the horizontal projection data of the image data in the direction of the character string; according to the detection, while the detecting position being shifted in the direction of the character string, the vertical projection of the image data in the vertical direction is calculated; and then a position having its vertical projection data, obtained in that way, exceeding a predetermined threshold is detected as a segmenting position of characters constituting the character string; in the meantime, a segmenting position of the characters included in the character string is detected according to either threshold of a first threshold and a second threshold, as the predetermined threshold, the first threshold being determined in accordance with the number of pixels between both ends of the character string detected from the vertical projection data, and the second threshold being determined in accordance with the number of the characters constituting the character string, out of positive peak values included in the vertical projection data (for example, refer to Patent Document 1).

Patent Document

Patent Document 1; Japanese Unexamined Patent Application Publication No. 2008-250754

In the case of the technology described in Patent Document 1; when the number of positive peaks of character segments detected by using an initial threshold (the first threshold) is not the same as the expected number of peaks, a character segmenting position is searched for by using a peak value as the second threshold, the peak value as the second threshold being given as an "N+1"-th peak value, counted from a maximum peak value, where positive peak values included in the vertical projection data are arranged in a descending order, wherein "N" is the number of characters constituting the character string. Unfortunately, the technology described in Patent Document 1 makes use of a magnitude relationship between a positive peak value and a threshold in order for detecting a segmenting position in a character string, and therefore how the threshold is specified becomes a matter to be considered.

If a character placed on an information recording medium is sharp enough, a peak value is clear and therefore even the technology described in Patent Document 1 is still able to carry out character recognition correctly. In the meantime, a character placed on an information recording medium is liable to be with its top part and the like affected by crush or noise; and therefore, in the case of a blurred character, missing a character border or wrongly detecting a character border point due to noise are likely to happen depending on a level of a threshold so that, in the case of the conventional technology, there is a risk that a stable recognition performance is inhibited. In such a case, it becomes difficult to correctly detect a character segmenting position so that unfortunately correct character recognition becomes unable.

SUMMARY

At least an embodiment of the present invention provides an apparatus, a method, and a program for character recognition that can adequately determine a character border position with a high degree of accuracy, regardless of conditions of the character border part, without specifying a threshold affecting the character recognition performance.

In order to give a solution to the issues described above, at least an embodiment of the present invention provides the following:

(1) A character recognition apparatus including an imaging means for imaging a character string placed on an information recording medium; a memory means for storing image data of the character string imaged by the imaging means; and a character segmenting unit for processing the image data so as to segment a character constituting the character string; characterized in that: the character segmenting unit comprises; a minimum intensity curve creating unit for detecting a minimum intensity value among light intensity values stored in a pixel row laid out in a direction perpendicular to a direction of the character string in the image data, and creating a minimum intensity curve of the image data according to the minimum intensity value of each pixel row; a character segmenting position detecting unit for calculating a space between the characters neighboring in the created minimum intensity curve, in order to detect a character segmenting position between the characters; and a character segmenting process unit for segmenting each character according to the detected character segmenting position between the characters.

According to at least an embodiment of the present invention; with respect to a character image area in image data of an imaged character string, the minimum intensity curve creating unit calculates a minimum intensity value with use of operation of scanning a pixel row in a direction perpendicular to a direction of the character string; and creates a minimum intensity curve by way of repeating the scanning operation, starting from a left-end light intensity row up to a right-end light intensity row in the character image area, in order to obtain a border point of each character in the direction of the character string on the basis of the minimum intensity curve. Therefore, a character space, and a blank space between two characters are definitely separated each other so that a character segmenting position can accurately be determined.

The character recognition apparatus according to at least an embodiment of the present invention can adequately determine a character border position with a high degree of accuracy, regardless of conditions of the character border part, without specifying a threshold affecting the character recognition performance, in such a way as to enhance an improvement in character recognition performance.

(2) It is characterized in that the character segmenting unit includes a character width specifying unit where a standard character width is specified, and a character space detection unit for comparing the standard character width with the minimum intensity curve so as to detect a space, being wider than the standard character width, as a character space.

According to at least an embodiment of the present invention; even though a blot or a pinpoint exists in a blank space between characters, a space being wider than the standard character width is detected as a character space. Therefore, a wrong detection of a character space owing to a blot or a pinpoint can be excluded so that it becomes possible to appropriately determine a character border position.

(3) It is characterized in that the minimum intensity curve creating unit detects a minimum intensity value according to the image data binarized, so as to create a minimum intensity curve.

According to at least an embodiment of the present invention; when the image data binarized is used, a judgment can be simply made along the minimum intensity curve in such a way as to consider a space with its light intensity value=0 (a dark space) to be a character space, and meanwhile a space with its light intensity value=255 (a white space) to be a blank space. Therefore, being compared with segmenting a character by using multiple-value image data, a character in this case can be segmented at high speed.

(4) A character recognition method for recognizing a character string by way of processing image data obtained by imaging the character string placed on an information recording medium, characterized in that: the character recognition method comprises; a step of creating a minimum intensity curve for detecting a minimum intensity value among light intensity values stored in a pixel row laid out in a direction perpendicular to a direction of the character string in the image data, and creating a minimum intensity curve of the image data according to the minimum intensity value of each pixel row; a step of detecting a character segmenting position for calculating a space between the characters neighboring in the created minimum intensity curve, in order to detect a character segmenting position between the characters; and a step of a character segmenting process for segmenting each character according to the detected character segmenting position between the characters.

According to at least an embodiment of the present invention; with respect to a character image area in image data of an imaged character string, the step of creating a minimum intensity curve calculates a minimum intensity value with use of operation of scanning a pixel row in a direction perpendicular to a direction of the character string; and creates a minimum intensity curve by way of repeating the scanning operation, starting from a left-end light intensity row up to a right-end light intensity row in the character image area, in order to obtain a border point of each character in the direction of the character string on the basis of the minimum intensity curve. Therefore, a character space, and a blank space between two characters are definitely separated each other so that a character segmenting position can accurately be determined.

The character recognition method according to at least an embodiment of the present invention can adequately determine a character border position with a high degree of accuracy, regardless of conditions of the character border part, without specifying a threshold affecting the character recognition performance, in such a way as to enhance an improvement in character recognition performance.

(5) A character recognition program for getting a computer to execute a character segmenting process for segmenting each character out of a character string by way of processing image data obtained by imaging the character string placed on an information recording medium; characterized in that: the character recognition program gets the computer to execute the procedures of: creating a minimum intensity curve for detecting a minimum intensity value among light intensity values stored in a pixel row laid out in a direction perpendicular to a direction of the character string in the image data, and creating a minimum intensity curve of the image data according to the minimum intensity value of each pixel row; detecting a character segmenting position for calculating a space between the characters neighboring in the created minimum intensity curve, in order to detect a character segmenting position between the characters; and a character segmenting process for segmenting each character according to the detected character segmenting position between the characters.

According to at least an embodiment of the present invention; with respect to a character image area in image data of an imaged character string, the procedure of creating a minimum intensity curve calculates a minimum intensity value with use of operation of scanning a pixel row in a direction perpendicular to a direction of the character string; and creates a minimum intensity curve by way of repeating the scanning operation, starting from a left-end light intensity row up to a right-end light intensity row in the character image area, in order to obtain a border point of each character in the direction of the character string on the basis of the minimum intensity curve. Therefore, a character space, and a blank space between two characters are definitely separated each other so that a character segmenting position can accurately be determined.

The character recognition program according to at least an embodiment of the present invention can adequately determine a character border position with a high degree of accuracy, regardless of conditions of the character border part, without specifying a threshold affecting the character recognition performance, in such a way as to enhance an improvement in character recognition performance.

According to at least an embodiment of the present invention, it becomes possible to adequately determine a character border position with a high degree of accuracy, regardless of conditions of the character border part, without specifying a threshold affecting the character recognition performance, in such a way as to enhance an improvement in character recognition performance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a block diagram showing a configuration example of a character recognition apparatus in relation to an embodiment of the present invention.

FIG. 2 is a diagram showing an example of image data captured by imaging a character string printed in an OCR character recording area formed on an information recording medium.

FIG. 3 is a block diagram showing a configuration example of a character segmenting unit in relation to the present embodiment.

DESCRIPTION OF THE PREFERRED EMBODIMENTS

Figure 4:
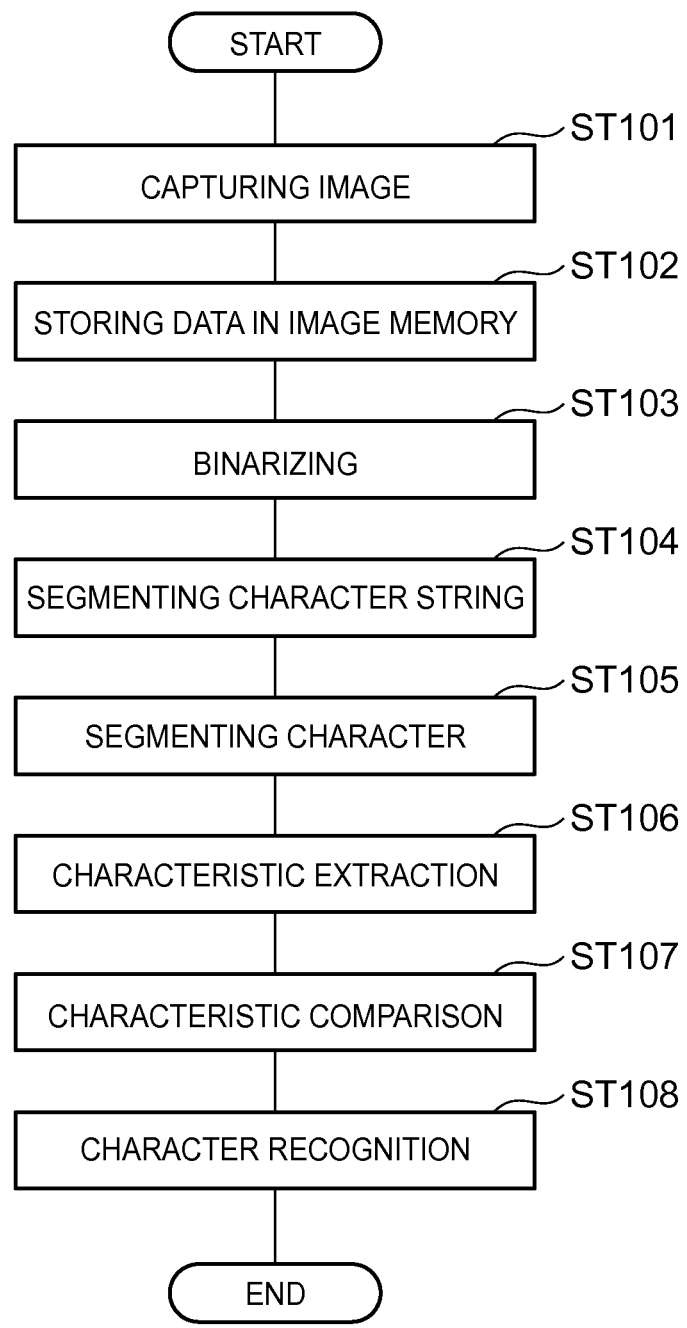
FIG. 4 is a flowchart for explaining operation of the character recognition apparatus in relation to the present embodiment.

Embodiments of the present invention are described below with reference to the accompanying drawings.

FIG. 1 is a block diagram showing a configuration example of a character recognition apparatus in relation to an embodiment of the present invention.

A character recognition apparatus 10 according to the present embodiment has a function of segmenting each character out of a character string segmented from image data and recognizing the character, by means of processing the image data obtained by image-capturing the character string placed on an information recording medium 20 made of paper, plastic, and the like.

The character recognition apparatus 10 carries out characteristic operation as described below according to image recognition technology, at the time of detecting (searching for) a segmenting position between characters in the character string inside the captured image.

At the time of creating projection in character segmenting operation, in the case where the characters are arranged in a horizontal direction as a first direction, i.e., an X-axis direction, the character recognition apparatus 10 creates the projection to the X-axis. Meanwhile, in the case where the characters are arranged in a vertical direction as a second direction perpendicular to the first direction, i.e., a Y-axis direction, the character recognition apparatus 10 creates the projection to the Y-axis. In the following description, explained is an example in which projection is created to the X-axis while the characters being arranged in the horizontal direction as the first direction, i.e., an X-axis direction.

With respect to a character image area to be formed according to a position of the character string, the character recognition apparatus 10 calculates a minimum intensity curve, by means of repeating calculation of a minimum intensity value with use of operation of scanning each pixel row in a direction perpendicular to the character string; wherein the calculation of the minimum intensity value is repeated, starting from a left-end light intensity row up to a right-end light intensity row in the character image area. Then, a border point of each character in the direction of the character string is calculated in accordance with the minimum intensity curve.

Explained below are a concrete configuration of the character recognition apparatus 10 and a function of character recognition processing with regard to a captured image.
(Configuration and Functions of Character Recognition Apparatus)

As shown in FIG. 1, the character recognition apparatus 10 includes: a contact-type (one-dimensional) imaging element 11 as an image scanning unit for reading a character string placed on an information recording medium, an image memory 12 for storing image data of the character string imaged by the imaging element 11, a data processing unit 13 for recognizing the character string by way of processing the image data stored in the image memory 12.

Then, the data processing unit 13 includes: a binarizing unit 131 for binarizing the image data, a character string segmenting unit 132 for segmenting the character string out of the image data, a character segmenting unit 133 for segmenting each character out of the character string, a characteristic extracting unit 134 for extracting an amount of characteristic out of a character pattern obtained in the character segmenting unit 133, a characteristic comparator unit 135 for comparing a characteristic vector and a reference vector, a characteristic dictionary storage unit 136 for storing characteristics of each character in advance, and a similar character recognizing unit 137 for calculating a level of similarity between a characteristic vector of an input pattern and a reference vector of each character in the characteristic dictionary. Incidentally, these units behave as an example of a character recognition unit for recognizing a character string placed on the information recording medium 20, for example, an OCR character string.

FIG. 2 is a diagram showing an example of image data, captured by imaging a character string printed in an OCR character recording area 21 (refer to FIG. 1) of the information recording medium 20.

The imaging element 11 as an image scanning unit captures an image of an OCR character string of the OCR character recording area 21 placed on the information recording medium 20, and carries out photoelectric conversion of the OCR character string. The image memory 12 memorizes (stores) the image data, such as the OCR character string imaged by the imaging element 11. Incidentally, the image memory 12 may be materialized with any device; such as a RAM, an SDRAM, a DDRSDRAM, an RDRAM, and the like, as long as the device can store image data.

When the information recording medium 20 is transferred along a transfer guide of a medium transfer mechanism, the one-dimensional imaging element 11 captures an image of a character pattern of the OCR character string and photoelectric conversion is then carried out, and the image data is stored in the image memory 12 in a data input section; the OCR character string such as, for example, shown in FIG. 2, being printed in the OCR character recording area 21 of the information recording medium 20. The data processing unit 13 is configured in such a way that, while the image data stored in the image memory 12 being read out, various processes are carried out at each of the units described above so as to finally recognize the OCR character string placed on the information recording medium 20.

Although, in the embodiment with reference to the drawings, a contact-type one-dimensional imaging element is adopted as the imaging element 11 for purposes of downsizing the device and others, it is also possible to adopt a two-dimensional area sensor and the like that is aimed at the character string of the information recording medium 20 as a reading target. In such a case, the imaging element 11 is materialized, for example, with a CCD or a CMOS sensor.

Although, in the present embodiment, the information recording medium 20 is a passport, it is not limited only to such a passport. The information recording medium 20 may also be a commonly-used card in conformity with JIS, such as a plastic card having a size of a width of 86 mm, a height of 54 mm, and a thickness of 0.76 mm; moreover, it may be an ID card, or a driver license. Furthermore, at least an embodiment of the present invention can be applied not only to a type-print character but also to a hand-writing character, as a recognition object. Still further, at least an embodiment of the present invention can be applied not only to character recognition but also to decoding a 1D bar code and a 2D bar code, and the like.

(Configuration and Function of Each Unit in Data Processing Unit)

Explained next are fundamental configuration and functions of each unit of the data processing unit 13.

Reading out the image data from the image memory 12, the data processing unit 13 converts the data into a black-and-white binary image, in the case where the image data is a multi-level grayscale image.

The binarizing unit 131 carries out a binarizing process with respect to the image data read out from the image memory 12. The binarizing unit 131 calculates a threshold by making use of an appropriate method (for example, a discrimination analysis method), and converts the original image into the black-and-white binary image. Then, it is assumed that, in the data processing unit 13, the following processes are carried out by using the black-and-white binary image.

In a binarizing process, a multi-level grayscale image is converted into a black-and-white image. Specifically to describe, binarizing operation is a process in which a histogram is created in accordance with light intensity values (grayscale level values) of an image, and then the histogram is separated into two parts with reference to a specific value called a threshold; i.e., one part being equal to or less than the threshold, and the other part being equal to or greater than the threshold; and white (a light intensity value=255) and black (a light intensity value=0) are assigned to those parts, respectively. As a method for automatically selecting the threshold by making use of a technique of statistics and the like, conventionally there are lots of ways disclosed; for example, a discrimination analysis method, Kittler method, a mode method, a p-tile method and so on; and all these methods are publicly known. In the present specification document, the methods for automatically selecting a threshold, as described above, by making use of mathematical means such as statistics, are collectively called an automatic threshold-selection method.

The character string segmenting unit 132 projects the character string, binarized by the binarizing unit 131, in a horizontal direction so as to detect upper and lower edges of the character string. Then, the character string segmenting unit 132 segments the character string; while identifying a center position between the upper and lower edges, as a center line of the character string. In this explanation, the horizontal direction is the first direction; along which the characters are horizontally arranged; i.e., an X-axis direction.

The character segmenting unit 133 of the present embodiment detects a segmenting position from the character string of the line segmented by the character string segmenting unit 132, in a direction in which the characters of the character string are arranged; namely in a horizontal direction in the present embodiment; and carries out segmenting a character. Specifically to describe, the character segmenting unit 133 of the present embodiment sets up a temporary segmenting area (refer to FIG. 9); for example, a rectangular area; which surrounds five characters as recognition targets. Then, the character segmenting unit 133 creates (forms) vertical projection in a vertical direction, perpendicular to the direction in which the characters are arranged, in the rectangular area. In this explanation, when the characters are arranged in the horizontal direction, i.e., the X-axis direction, the character segmenting unit 133 creates the projection to the X-axis, as described above, at the time of creating the projection.

For segmenting the characters constituting the character string, the character segmenting unit 133 includes: a minimum intensity curve creating unit 1331 for detecting a minimum intensity value among light intensity values stored in a pixel row laid out in the direction perpendicular to the direction of the character string in the image data, and creating a minimum intensity curve of the image data according to the minimum intensity value of each pixel row; a character segmenting position detecting unit 1332 for calculating a space between neighboring characters in the created minimum intensity curve so as to detect a segmenting position between the characters; and a character segmenting process unit 1333 for segmenting each character according to the detected segmenting position between the characters. Incidentally, character segmenting operation in the character segmenting unit 133 is described later in detail.

When the character segmenting operation by the character segmenting unit 133 finishes in the data processing unit 13, a circumscribing rectangular area (i.e., coordinate values of an upper end, a lower end, a right end, and a left end) of characters as recognition targets is calculated.

The characteristic extracting unit 134 divides the above described circumscribing rectangular area into arbitrary sub areas; for example, divides one circumscribing rectangular area into 5×5 areas. Then, each of those areas being dealt with as a sub area; with respect to the sub area, a ratio of the number of black pixels to the number of all pixels in the sub area is calculated in order to create a characteristic vector that includes the calculated ratio as an element.

The characteristic comparator unit 135 makes a comparison between the characteristic vector, calculated by the characteristic extracting unit 134, with reference characteristic vectors calculated in advance with regard to all characters to be used for the medium, and sets up a character corresponding to a reference characteristic vector, which shows a highest level of similarity (for example, a normalized correlation coefficient), as a candidate character. Incidentally, the reference characteristic vectors are stored in advance in the characteristic dictionary storage unit 136. At the time of making a characteristic comparison, a datum of a character with a high level of similarity is read out from the characteristic dictionary storage unit 136, and then a characteristic comparison is made in the characteristic comparator unit 135.

Basically, the similar character recognizing unit 137 recognizes the candidate character, which is set up by means of the characteristic comparison in the characteristic comparator unit 135, as a character used in the medium. Incidentally, if there exist a plurality of candidate characters with a level of similarity greater than a specific value, no character recognition can be carried out, and therefore in such a case, the similar character recognizing unit 137 makes a judgment on the similar characters by making use of a secondary amount of characteristic that can be drawn from a characteristic vector. For example, the similar character recognizing unit 137 may be so configured as to create a partial characteristic vector for studying similarity between the parts, while splitting an arbitrarily-divided sub area into two parts; i.e, a right half part and a left half part; which are line-symmetrical in a horizontal direction; or, the similar character recognizing unit 137 may be so configured as to study similarity, while splitting an sub area into two parts, in the similar manner; i.e, an upper half part and a lower half part; which are line-symmetrical in a vertical direction. Moreover, the similar character recognizing unit 137 may be configured in such a way as to study similarity by taking advantage of point symmetry, in the same way as making use of line-symmetry in a horizontal direction or a vertical direction.

Explained next in details is operation of detecting a character segmenting position (character segmenting operation) in the character segmenting position detecting unit 1332 of the character segmenting unit 133 having a characteristic function in the character recognition apparatus 10 according to the present embodiment.

(Configuration of Character Segmenting Unit)

FIG. 3 is a block diagram showing a configuration example of a character segmenting unit in relation to the present embodiment.

As shown in FIG. 3, the character segmenting unit 133 in relation to the present embodiment includes: the minimum intensity curve creating unit 1331, the character segmenting position detecting unit 1332, and the character segmenting process unit 1333. In other words, the character segmenting unit 133 is equipped with: the character segmenting position detecting unit 1332 for calculating a space between neighboring characters in a minimum intensity curve, created by the minimum intensity curve creating unit 1331, in order to detect a character segmenting position between the characters; and the character segmenting process unit 1333 for segmenting each character according to the detected character segmenting position between the characters.

The minimum intensity curve creating unit 1331 detects a minimum intensity value among light intensity values stored in a pixel row laid out in the direction perpendicular to the direction of the character string in the image data, and then creates a minimum intensity curve of the image data according to the minimum intensity value of each pixel row. Specifically to describe, with respect to a character image area to be formed according to a position of the character string obtained by a character string detecting process, the minimum intensity curve creating unit 1331 repeats calculating operation of a minimum intensity value with use of operation of scanning a pixel row in a direction perpendicular to the character string; wherein the calculating operation of the minimum intensity value is repeated, starting from a left-end light intensity row up to a right-end light intensity row in the character image area; so as to create the minimum intensity curve. Then, a rectangular temporary segmentation area RCT is provided in such a way as to surround two characters neighboring in a recognizing operation object, with respect to one line of a character string segmented by the character string segmenting unit 132.

The character segmenting position detecting unit 1332 calculates a space between the characters neighboring in the created minimum intensity curve, in order to detect a character segmenting position between the characters. Specifically to describe, the character segmenting position detecting unit 1332 calculates a border point of each character in the direction of the character string, in accordance with the minimum intensity curve. In the present embodiment, a black-and-white binary image is used in operation of the character segmenting unit 133; and therefore, a detection of a character segmenting position is carried out simply along the minimum intensity curve, while a space with its light intensity value=0 (a dark space) being dealt with as a character space, and meanwhile a space with its light intensity value=255 (a white space) being dealt with as a blank space, in such a way as to deal with a middle point in the blank space as a segmenting point.

Figure 8:
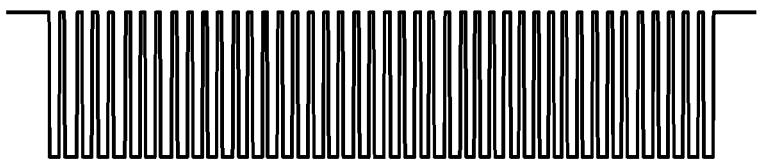
FIG. 8 is a diagram showing an example of a minimum intensity curve to be created by the minimum intensity curve creating unit in relation to the present embodiment, with respected to the image data shown in FIG. 2.
Figure 10:
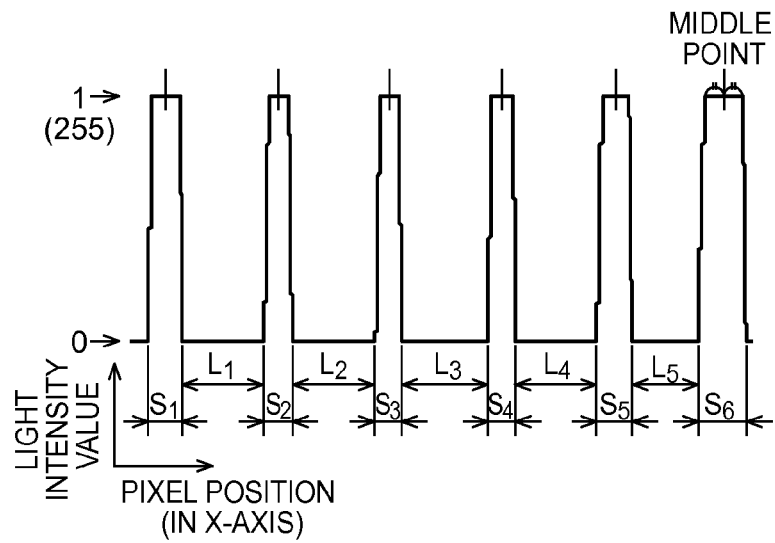
FIG. 10 is a diagram showing an example of a minimum intensity curve to be created by the minimum intensity curve creating unit in relation to the present embodiment, with respected to the image data shown in FIG. 10.

The character segmenting process unit 1333 segments each character according to the detected segmenting position between the characters. Although, in the present embodiment, the minimum intensity curve creating unit 1331 is so configured as to create the minimum intensity curve in the specified rectangular RCT, the present invention is not limited to the configuration. For example, it is also possible that, with a minimum intensity curve for an entire part of the character string being created (refer to FIG. 8), a configuration is made in such a way that a minimum intensity curve corresponding to a certain area specified (refer to FIG. 10) is used for the specified area. Incidentally, in FIG. 8, the vertical axis shows the same light intensity values as shown in FIG. 10, and the horizontal axis shows the same pixel positions as shown in FIG. 10.

(Overall Behavior of Character Recognition Apparatus,)

Overall behavior of the character recognition apparatus 10 according to the present embodiment is explained next in relation to FIG. 4. FIG. 4 is a flowchart for explaining operation of a character recognition apparatus in relation to the present embodiment.

When the information recording medium is transferred along a transfer guide of a medium transfer mechanism, the one-dimensional imaging element 11 captures an image of a character pattern of the OCR character string printed in the OCR character recording area 21 of the information recording medium 20, and photoelectric conversion is then carried out (Step ST101). Then, the character pattern is stored, for example, as 256-level multiple-value image data in the image memory 12 (Step ST102).

Next, the binarizing unit 131 carries out a binarizing process, as necessary, with respect to the image stored in the image memory 12 (Step ST103). Specifically to describe, in the data processing unit 13, the image data is read out from the image memory 12; and the binarizing unit 131 converts the grayscale image into a black-and-white binary image, in the case where the image data is a multi-level grayscale image. More specifically to describe, the binarizing unit 131 calculates a threshold by making use of an appropriate method (for example, a discrimination analysis method), and converts the original image into the black-and-white binary image.

Next, the character string segmenting unit 132 segments the character string (string segmentation) (Step ST104). Specifically to describe, the character string segmenting unit 132 projects the character string, binarized by the binarizing unit 131, in a horizontal direction so as to detect upper and lower edges of the character string. Then, the character string segmenting unit 132 segments the character string; while identifying a center position between the upper and lower edges, as a center line of the character string.

Figure 9:
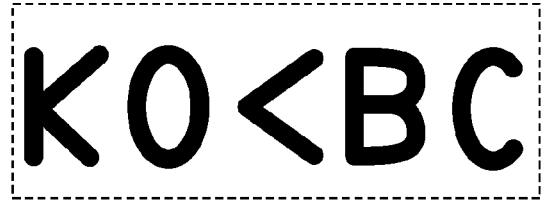
FIG. 9 is a diagram showing image data when characters constituting a character string are focused.

Next, character segmenting operation is carried out (Step ST105) in the character segmenting unit 133 including the character segmenting position detecting unit 1332. In the minimum intensity curve creating unit 1331, projection is created in the rectangular area. For example, when the characters are arranged in the horizontal direction (the X-axis direction), the projection is formed to the X-axis as described above, at the time of forming the projection. In the present embodiment, a black-and-white binary image is used in operation of the character segmenting unit 133; and therefore, only required is to carry out a detection of a character segmenting position simply along the minimum intensity curve, while a space with its light intensity value=0 (a dark space) being dealt with as a character space, and meanwhile a space with its light intensity value=255 (a white space) being dealt with as a blank space, in such a way as to deal with a middle point in the blank space as a segmenting point. A minimum intensity curve corresponding to a part shown in FIG. 9 is given as FIG. 10 shows. Incidentally, although the vertical axis in FIG. 10 is to represent with white (1) and black (0) because FIG. 10 is created on the basis of the image data binarized, a light intensity value=255 is assumed for white (1) since an intermediate value between (0) and (1) is sometimes processed. An assumption in this way makes it possible to process such an intermediate value as an integer, without showing the intermediate value as a value having a decimal point, so that the calculation process becomes easier.

As the character segmenting operation finishes at Step ST105, a circumscribing rectangular area (i.e., coordinate values of an upper end, a lower end, a right end, and a left end) of characters as recognition targets is calculated.

Next, characteristic extraction is carried out (Step ST106) in the characteristic extracting unit 134. Specifically to describe, the characteristic extracting unit 134 divides the above described circumscribing rectangular area into arbitrary sub areas (for example; dividing one circumscribing rectangular area into 5×5 areas, and then, each of those areas is dealt with as a sub area). With respect to each sub area, a ratio of the number of black pixels to the number of all pixels in the sub area is calculated in order to create a characteristic vector that includes the calculated ratio as each element.

Next, a characteristic comparison is made (Step ST107) in the characteristic comparator unit 135. Specifically to describe, in the characteristic comparator unit 135, the characteristic vector calculated at Step 106 is compared with the reference characteristic vectors that are calculated in advance with regard to all characters to be used for the medium, and stored in the characteristic dictionary storage unit 136. Then, a character corresponding to a reference characteristic vector, which shows a highest level of similarity (for example, a normalized correlation coefficient), is set up as a candidate character.

Finally, character recognition is carried out (Step ST108). Specifically to describe, the candidate character, which is set up by means of the characteristic comparison at Step ST107, is recognized as a character used in the medium. Incidentally, if there exist a plurality of candidate characters with a level of similarity greater than a specific value, no character recognition can be carried out. Therefore, in such a case, the similar character recognizing unit 137 makes a judgment on the similar characters by making use of a secondary amount of characteristic that can be drawn from a characteristic vector.

For example, while splitting an arbitrarily-divided sub area into two parts; i.e, a right half part and a left half part; which are line-symmetrical in a horizontal direction, the character recognition may be so carried out as to create a partial characteristic vector for studying similarity between the parts. In the similar manner, while splitting a sub area into two parts, in the similar manner; i.e, an upper half part and a lower half part; which are line-symmetrical in a vertical direction, the character recognition may be so carried out as to study similarity. Moreover, the character recognition may be so carried out as to study similarity by taking advantage of point symmetry, in the same way as making use of line-symmetry in a horizontal direction or a vertical direction.

(Concrete Example of Character Segmenting Operation According to Present Embodiment)

Figure 5:
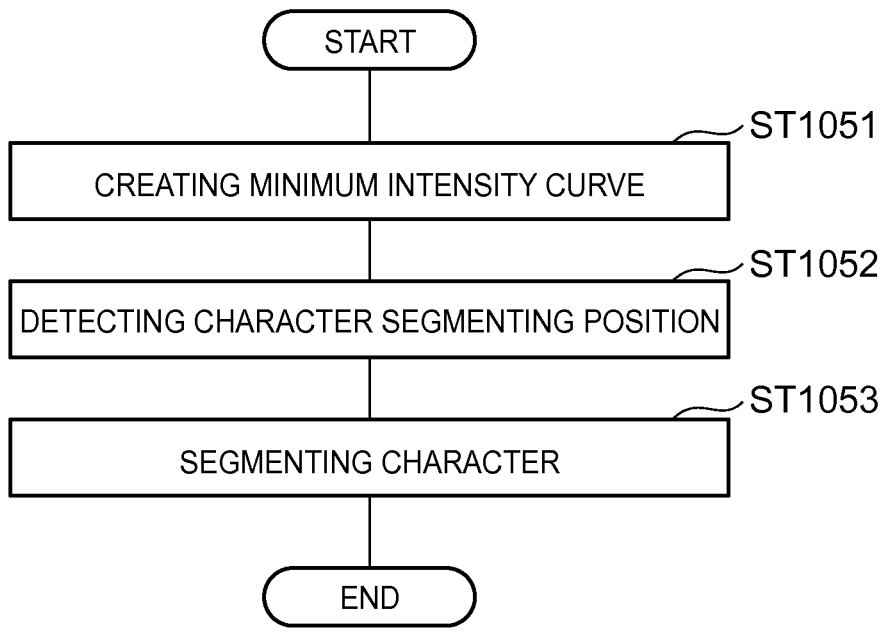
FIG. 5 is a flowchart showing a process flow of the character segmenting unit in relation to the present embodiment.
Figure 6:
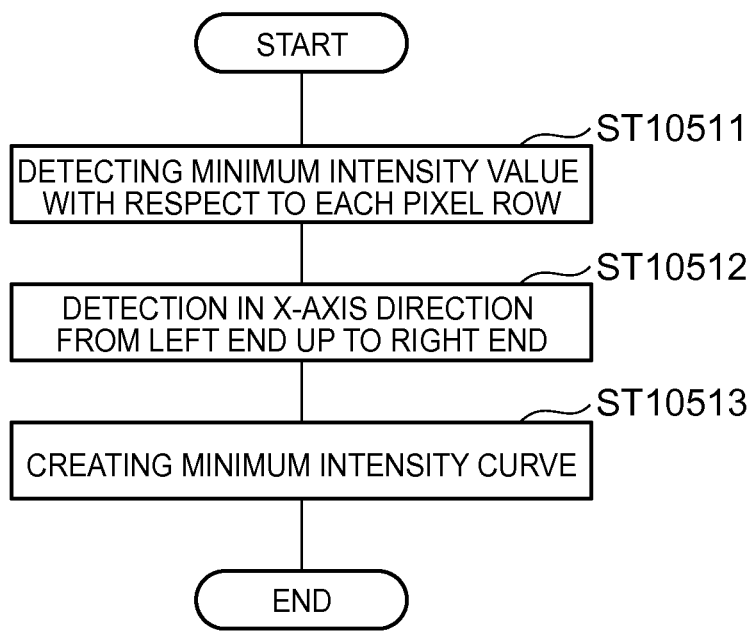
FIG. 6 is a flowchart showing a process flow of a minimum intensity curve creating unit in the character segmenting unit in relation to the present embodiment.
Figure 7:
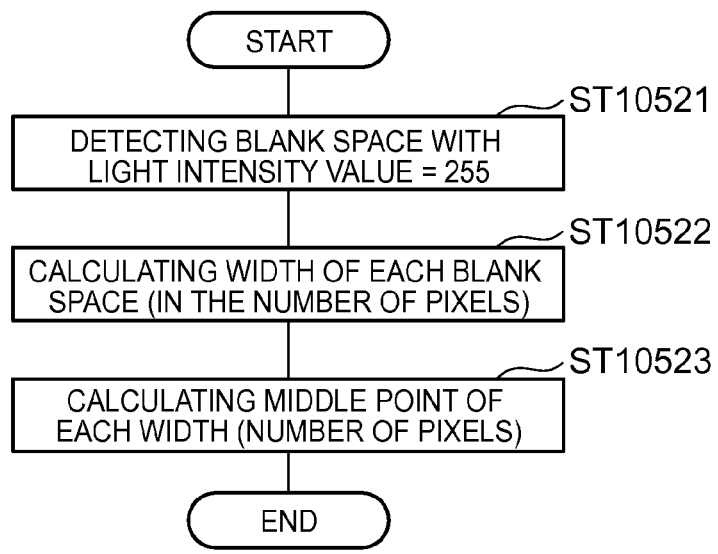
FIG. 7 is a flowchart showing a process flow of a character segmenting position detecting unit in the character segmenting unit in relation to the present embodiment.

Next, an example of character segmenting operation in the character segmenting unit 133 having features described above is explained below more specifically, in relation to FIG. 5 through FIG. 7. FIG. 5 is a flowchart showing a process flow of the character segmenting unit in relation to the present embodiment. FIG. 6 is a flowchart showing a process flow of a minimum intensity curve creating unit in the character segmenting unit in relation to the present embodiment. FIG. 7 is a flowchart showing a process flow of a character segmenting position detecting unit in the character segmenting unit in relation to the present embodiment.

FIG. 9 is a diagram showing image data when characters (partially) constituting a character string are focused. In this explanation, it is assumed that an image IMG for character recognition is given in the character recognition apparatus 10, as FIG. 9 shows. In an example of FIG. 9, shown is an image of character string including characters of 'K', 'O', '<', 'B', and 'C'. Moreover, FIG. 10 is a vertical projection datum obtained by way of vertical projection on the image data shown in FIG. 9.

Incidentally, FIG. 9 shows the image data of 'K' to 'C' shown in FIG. 2. As an example, this character string corresponds to a character string in a second line of image data, obtained by way of imaging the characters printed in the OCR character recording area 21 of the information recording medium 20 exemplified in FIG. 2. Moreover, in the example shown in FIG. 9, a space is formed between neighboring characters, in an arrangement direction of the characters (a direction in which the characters are laid out); and therefore a border between the two neighboring characters is clear. Each character in the present embodiment is so formed as to have a predetermined width (a specified character width) in general; and furthermore, a space having a specified width is formed between two neighboring characters.

As shown in FIG. 5, the minimum intensity curve creating unit 1331 detects a minimum intensity value among light intensity values stored in a pixel row laid out in the direction perpendicular to the direction of the character string in the image data, and then creates a minimum intensity curve of the image data according to the minimum intensity value of each pixel row (Step ST1051).

Specifically to describe, as shown in FIG. 6, with respect to a character image area to be formed according to a position of the character string obtained by a character string detecting process, the minimum intensity curve creating unit 1331 calculates a minimum intensity value with use of operation of scanning a pixel row in a direction (Y-axis direction) perpendicular to a direction of the character string (X-axis direction)

(Step ST10511). In the character image area, the above-mentioned operation is repeated in the X-axis direction, starting from a left-end light intensity row up to a right-end light intensity row, so as to detect the minimum intensity value of each pixel row (Step ST10512). Then, according to the detected minimum intensity value of each pixel row, the minimum intensity curve of the character image area is created, as FIG. 10 shows (Step ST10513).

Next, the character segmenting position detecting unit 1332 calculates a space between the characters neighboring in the minimum intensity curve created by the minimum intensity curve creating unit 1331, in order to detect a character segmenting position between the characters (Step ST1052).

Specifically to describe, as shown in FIG. 7, the character segmenting position detecting unit 1332 detects a space with its light intensity value=255 (a white space) as a blank space, along the minimum intensity curve (Step ST10521). Then, a width of each blank space (in the number of pixels) is calculated (Step ST10522), as S1 to S6 shown in FIG. 10.

Next, a middle point of the width in each blank space (S1 to S6) is calculated so as to detect the middle point of the blank space as a segmenting point between characters (Step ST10523). Incidentally, in FIG. 10, a space with its light intensity value=0 (L1 to L5) (a dark space) is a character space.

Finally, the character segmenting process unit 1333 segments each character according to the detected character segmenting position between characters (the middle point of the blank space) (Step ST1053).

(Other Embodiments)

Since a minimum value of each pixel row in the image data is calculated by use of the minimum intensity curve created in the minimum intensity curve creating unit 1331, a blot or a pinpoint existing in a blank space between characters may have a chance to build up a false character space. In order to avoid such a wrong detection of a character space owing to a blot or a pinpoint, it is needed only to specify a standard character width for judging any space width, being narrower in comparison with the standard character width, not to be a character. The character recognition apparatus 10 according to the present embodiment may be configured in such a way that the character segmenting unit 133 includes a character width specifying unit where a standard character width is specified, and a character space detection unit for comparing the standard character width with the minimum intensity curve so as to detect a space as a character space, in the case where the space with its light intensity value=0 in the minimum intensity curve is wider than the standard character width.

The character recognition apparatus 10 according to the present embodiment may be configured in such a way that; an entire image is not binarized at an initial step, in the data processing unit 13, and character string detection and character segmenting operation are carried out while leaving a multi-level image as it is; and afterward the image is binarized with its character area being confined. In this case, a minimum intensity curve is created in the character segmenting process by use of the multi-level image; and even in this case, the same operation can be carried out as it is done for using a minimum intensity curve by use of a binarized image, if an appropriate threshold is specified for segmenting a character.

Incidentally, the method explained above in detail can be so configured as to be created as a program according to the procedures described above, for being executed by a computer such as a CPU.

Then, with the program being stored in a recording medium, such as a semiconductor memory, a magnetic disc, an optical disk, and a Floppy (a registered trademark) disk; the method can be configured in such a way that the computer, in which the recording medium is installed, accesses the program in order to execute the program.

(Primary Advantageous Effect of the Present Embodiment)

According to the present embodiment as described above, with respect to a character image area in image data of an imaged character string, the minimum intensity curve creating unit calculates a minimum intensity value with use of operation of scanning a pixel row in a direction perpendicular to a direction of the character string; and creates a minimum intensity curve by way of repeating the scanning operation, starting from a left-end light intensity row up to a right-end light intensity row in the character image area, in order to obtain a border point of each character in the direction of the character string on the basis of the minimum intensity curve. Therefore, a character space and a blank space, between two characters, are definitely separated each other so that a character segmenting position can accurately be determined. Furthermore, according to at least an embodiment of the present invention, it is possible to adequately determine a character border position with a high degree of accuracy, regardless of conditions of the character border part, without specifying a threshold affecting the character recognition performance, in such a way as to enhance an improvement in character recognition performance.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A character recognition apparatus for use with an information recording medium, the character recognition apparatus comprising:
    an imaging element structured to read a character string placed on the information recording medium and create image data of the character string;
    an image memory structured to store the image data; and
    a character segmenting unit structured to process the image data so as to segment a character constituting the character string;
    wherein the image data comprises a plurality of pixels, each pixel having a light intensity value;
    wherein the plurality of pixels are arranged in a plurality of pixel rows extending in a direction perpendicular to the character string;
    wherein the character segmenting unit comprises
        a minimum intensity curve creating unit structured to:
            for each pixel row, detect a minimum intensity value among the light intensity values of each pixel of the pixel row; and
            create a minimum intensity curve according to the minimum intensity value of each pixel row, wherein a first axis of the minimum intensity curve is a position of a pixel row and a second axis of the minimum intensity curve is the minimum intensity value detected for the pixel row;

a character segmenting position detecting unit structured to calculate a space between the characters neighboring in the created minimum intensity curve, in order to detect a character segmenting position between the characters; and a character segmenting process unit configured to segment each character according to the detected character segmenting position between the characters.

2. The character recognition apparatus according to claim 1;

wherein the character segmenting unit includes a character width specifying unit where a standard character width is specified, and a character space detection unit for comparing the standard character width with the minimum intensity curve so as to detect a space, being wider than the standard character width, as a character space.

3. The character recognition apparatus according to claim 1:

wherein the minimum intensity curve creating unit detects a minimum intensity value according to the image data binarized, so as to create a minimum intensity curve.

4. A character recognition method for recognizing a character string by way of processing image data comprising a plurality of pixels, each pixel having a light intensity value, obtained by imaging the character string placed on an information recording medium, the character recognition method comprising:

dividing the plurality of pixels into a plurality of pixel rows extending in a direction perpendicular to the character string;

for each pixel row, detecting a minimum intensity value among the light intensity values of each pixel of the pixel row;

creating a minimum intensity curve according to the minimum intensity value of each pixel row, wherein a first axis of the minimum intensity curve is a position of a pixel row and a second axis of the minimum intensity curve is the minimum intensity value detected for the pixel row;

detecting a character segmenting position for calculating a space between the characters neighboring in the created minimum intensity curve, in order to detect a character segmenting position between the characters; and segmenting each character according to the detected character segmenting position between the characters.

5. A non-transitory computer-readable medium for segmenting each character out of a character string by way of processing image data comprising a plurality of pixels, each pixel having a light intensity value, obtained by imaging the character string placed on an information recording medium, the computer readable medium comprising computer-readable instructions that, when read by a computer, cause the computer to perform:

dividing the plurality of pixels into a plurality of pixel rows extending in a direction perpendicular to the character string;

for each pixel row, detecting a minimum intensity value among the light intensity values of each pixel of the pixel row;

creating a minimum intensity curve according to the minimum intensity value of each pixel row, wherein a first axis of the minimum intensity curve is a position of a pixel row and a second axis of the minimum intensity curve is the minimum intensity value detected for the pixel row;

detecting a character segmenting position for calculating a space between the characters neighboring in the created minimum intensity curve, in order to detect a character segmenting position between the characters; and segmenting each character according to the detected character segmenting position between the characters.

* * * * *